United States Patent

Baker et al.

[11] Patent Number: 6,165,422
[45] Date of Patent: Dec. 26, 2000

[54] APPARATUS FOR ELECTRIC-DISCHARGE TEXTURING OF A ROLL

[75] Inventors: James W. Baker, St. Clair Shores; William J. Murphy, Saginaw, both of Mich.

[73] Assignee: Modern Hard Chrome Service Company, Warren, Mich.

[21] Appl. No.: 09/259,835

[22] Filed: Mar. 1, 1999

[51] Int. Cl.[7] .............................. B01J 19/08; B01J 19/12
[52] U.S. Cl. ................................ 422/186.05; 422/186.04
[58] Field of Search ..................... 422/186.04, 186.05, 422/186.06

[56] References Cited

U.S. PATENT DOCUMENTS

| | | | |
|---|---|---|---|
| 2,864,756 | 12/1958 | Rothacker | 204/168 |
| 4,153,560 | 5/1979 | Dinter et al. | 422/186.05 |
| 4,239,973 | 12/1980 | Kolbe et al. | 422/186.05 |
| 5,026,463 | 6/1991 | Dinter et al. | |
| 5,888,713 | 3/1999 | Arrington et al. | 430/532 |

*Primary Examiner*—Kathryn Gorgos
*Assistant Examiner*—Wesley A. Nicolas
*Attorney, Agent, or Firm*—Brooks & Kushman P.C.

[57] ABSTRACT

Apparatus (10,10') for electric-discharge texturing of a round surface (12) of a roll (14) includes a bank of electrode positioners (32) mounted on a carriage supported housing (30) in axial rows (34) and circumferential columns (36) with the axial rows diverging from a central axis A of roll rotation and with the axial rows symmetrically located on opposite sides of an adjustment axis B along which the electrode positioners are moved by the housing. The adjustment axis B of the housing (30) is inclined upwardly away from the central axis A. The electrode positioners (32) can be provided in an odd number or an even number of axial rows (34) and, in either case, the circumferential columns (36) of the electrode positioners (32) are slightly axially inclined along the central axis A.

10 Claims, 2 Drawing Sheets

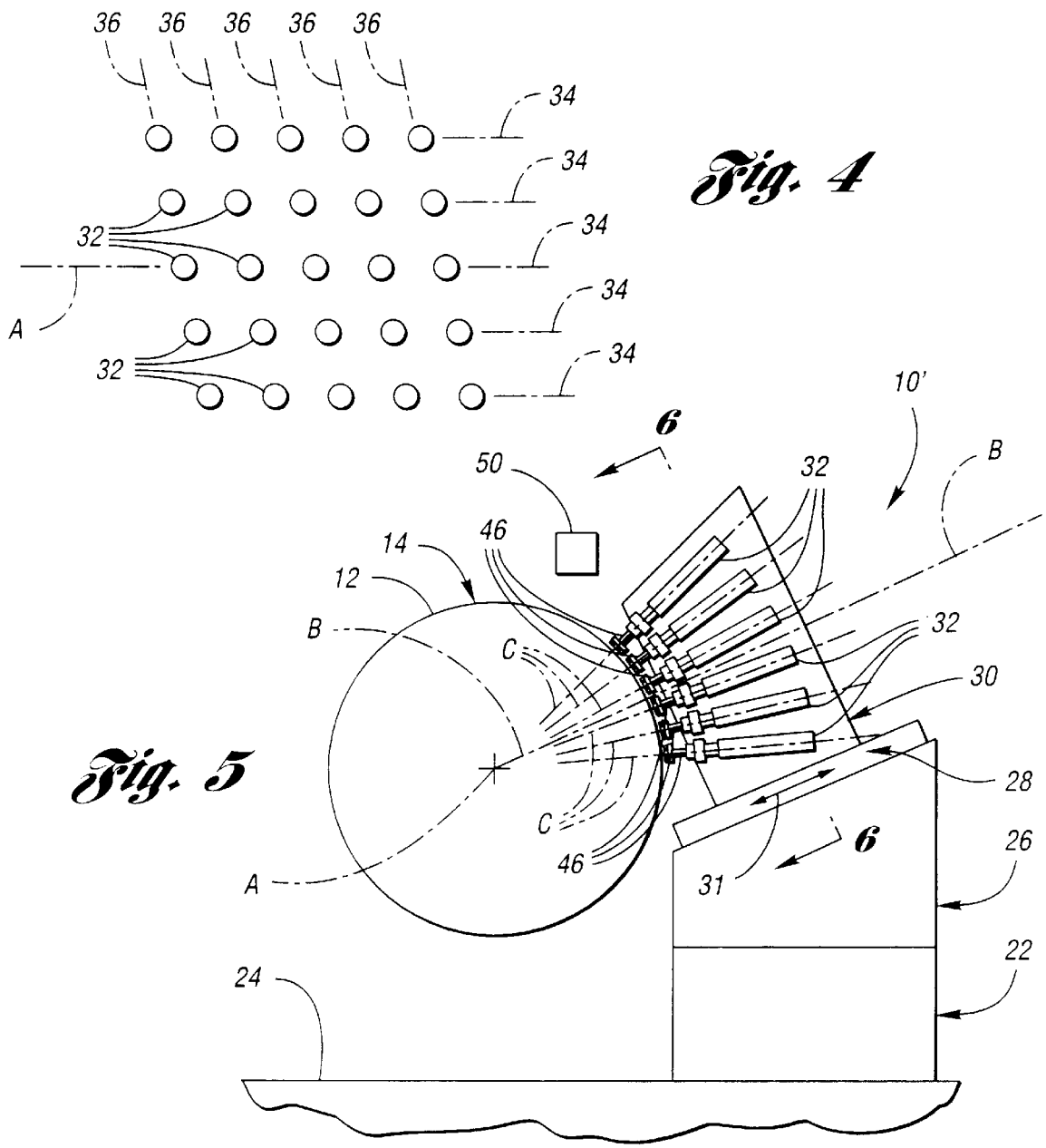
Fig. 4
Fig. 5
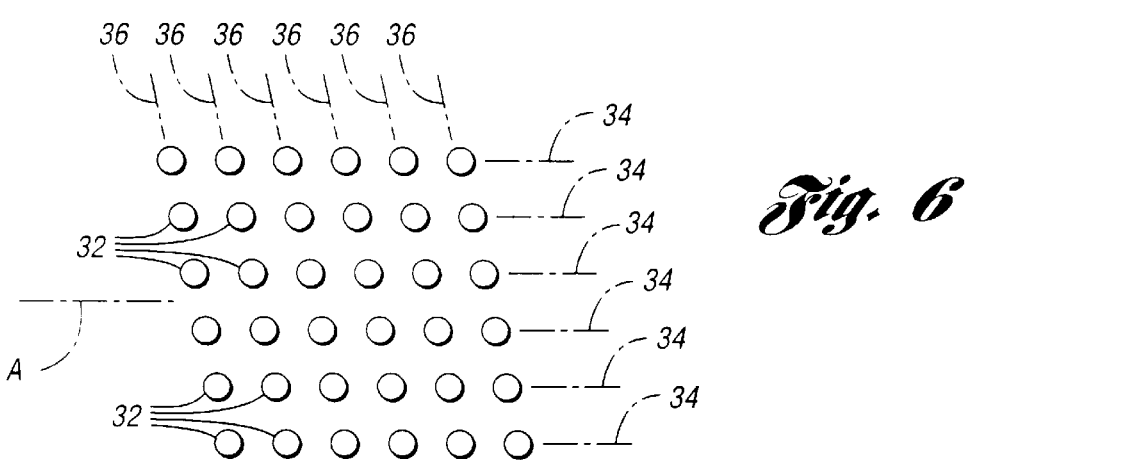
Fig. 6

APPARATUS FOR ELECTRIC-DISCHARGE TEXTURING OF A ROLL

TECHNICAL FIELD

This invention relates to apparatus for electric-discharge texturing of a round surface of a roll.

BACKGROUND ART

Electric-discharge machining which is conventionally referred to as EDM has been performed for many years by generating a voltage between an electrode and a workpiece through a dielectric fluid such that a spark momentarily generated removes a portion of the workpiece surface to perform machining. This general type of machining has more recently evolved into electric-discharge texturing wherein the surface of a workpiece is textured. For example, rolls used in steel mills to roll steel that is to be painted cannot be too smooth or the paint adhesion will not be good. Texturing of the rolls provides the rolled steel with a textured surface to which paint adheres better. This texturing is performed by electric-discharge texturing apparatus wherein a bank of electrodes are moved adjacent the roll surface as the roll is rotated. Electrode positioners ensure that each electrode is properly spaced with respect to the workpiece surface so as to be close enough to generate momentary sparks through dielectric fluid but not too close so as to generate a continuous current flow without any sparks to perform the texturing operation.

Electric-discharge texturing apparatus conventionally has its electrode positioners mounted in a bank of axial rows extending along the central axis of roll rotation and in generally circumferential columns with each electrode positioner moving its associated electrode along a feed axis toward and away from the roll. While it would be desirable for the feed axes of all of the rows to extend radially, this is not possible since the rolls to be textured can have different diameters.

DISCLOSURE OF INVENTION

An object of the present invention is to provide improved apparatus for electric-discharge texturing of a round surface of a roll.

In carrying out the above object, the apparatus for electric-discharge texturing of a round surface of a roll in accordance with the invention includes a rotational support for rotatably supporting and rotating the roll about a central axis. A main slideway of the apparatus extends parallel to the central axis, and a carriage of the apparatus is supported for movement along the main slideway and includes an auxiliary slideway that extends transversely to the central axis. An electrode positioner housing of the apparatus is mounted on the carriage by the auxiliary slideway for movement toward and away from the roll along an adjustment axis that extends radially from the central axis. A bank of electrode positioners are mounted on the housing in a plurality of axial rows along the central axis and in a plurality of generally circumferential columns along the central axis. The electrode positioners are each operable to support an electrode for movement along an associated feed axis toward and away from the roll to provide the proper positioning therebetween for the electric-discharge texturing. The feed axes of the electrode positioners of the axial rows extend angularly with respect to each other in an outwardly diverging manner from the roll and are equally angularly spaced from each other as well as being symmetrically located on opposite sides of the adjustment axis to facilitate positioning of the electrodes with rolls of relatively small diameters.

In the preferred construction of the apparatus, the adjustment axis of the housing is inclined upwardly away from the central axis to prevent dielectric fluid from entering the electrode positioners during the electric-discharge texturing operation.

In one embodiment, the bank of electrode positioners includes an odd number of axial rows with the feed axes of the electrode positioners of one axial row positioned along the adjustment axis and with the other axial rows being of the same number on opposite sides of the adjustment axis. The bank of electrode positioners with an odd number of axial rows most effectively has five axial rows.

In another embodiment, the bank of electrode positioners includes an even number of axial rows with the adjustment axis bisecting the angle between the feed axes of the electrode positioners of two axial rows and with the same number of axial rows positioned symmetrically on opposite sides of the adjustment axis. This embodiment of the bank of electrode positioners with an even number of axial rows most effectively has six axial rows.

In the preferred construction, each embodiment of the bank of electrode positioners includes circumferential columns that are slightly axially inclined along the central axis to provide distribution of the texturing operation.

BRIEF DESCRIPTION OF DRAWINGS

FIG. 4 is a view taken along the direction of line 4—4 in FIG. 2 to illustrate the positioning of the axial rows and circumferential columns of the bank of electrode positioners.

FIG. 5 is a view similar to FIG. 2 but of another embodiment which includes an even number of axial rows of electrode positioners.

FIG. 6 is a view taken along the direction of line 6—6 in FIG. 5 to illustrate the positioning of the bank of electrodes with the even number of axial rows.

BEST MODE FOR CARRYING OUT THE INVENTION

Figure 1:
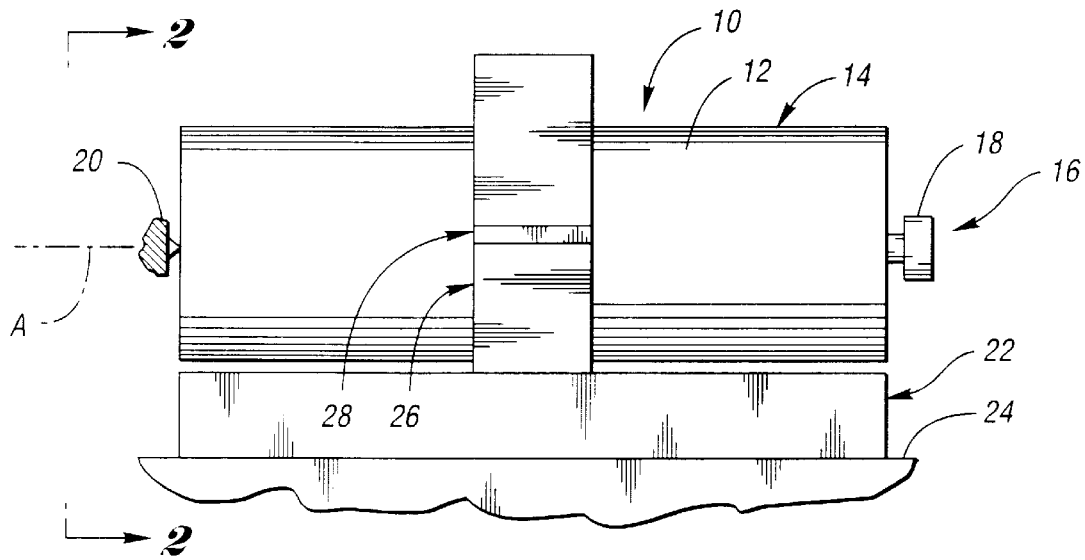
FIG. 1 is a side elevational view of apparatus for electric-discharge texturing of a roll in accordance with the invention.
Figure 2:
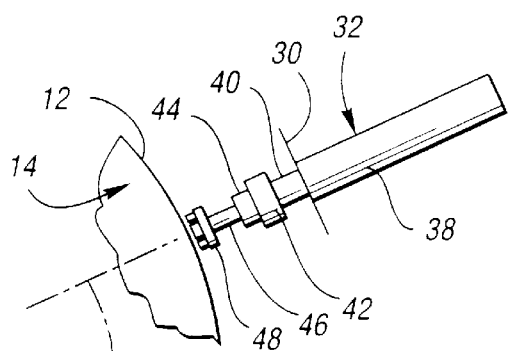
FIG. 2 is an axial view of the apparatus taken along the direction of line 2—2 in FIG. 1 and illustrates the angular arrangement of axial rows of electrode positioners with an odd number of the axial rows of these electrode positioners illustrated.

With reference to FIGS. 1 and 2 of the drawings, apparatus 10 for performing electric-discharge texturing of a round surface 12 of a roll 14 includes a rotational support 16 having headstock and tailstock centers 18 and 20, respectively, for rotatably supporting and rotating the roll about a central axis A. It is also possible for the roll 14 to have reduced diameter ends that provide bearing surfaces for rotatably supporting the roll during use as well as during the texturing operation. A main slideway 22 of the apparatus is mounted on the factory floor 24 and extends parallel to the central axis A. A carriage 26 is supported for movement along the main slideway 22 and includes an auxiliary slideway 28 that extends transversely to the central axis A.

An electrode positioner housing 30 of the apparatus is mounted on the carriage 26 by the auxiliary slideway 28 for movement as shown by arrows 31 (FIG. 2) toward and away from the roll along an adjustment axis B that extends radially from the central axis A. A bank of electrode positioners 32 is mounted on the housing 30 and, as shown in FIG. 4, is arranged in a plurality of axial rows 34 along the central axis A and in a plurality of generally circumferential columns 36 along the central axis A.

Figure 3:
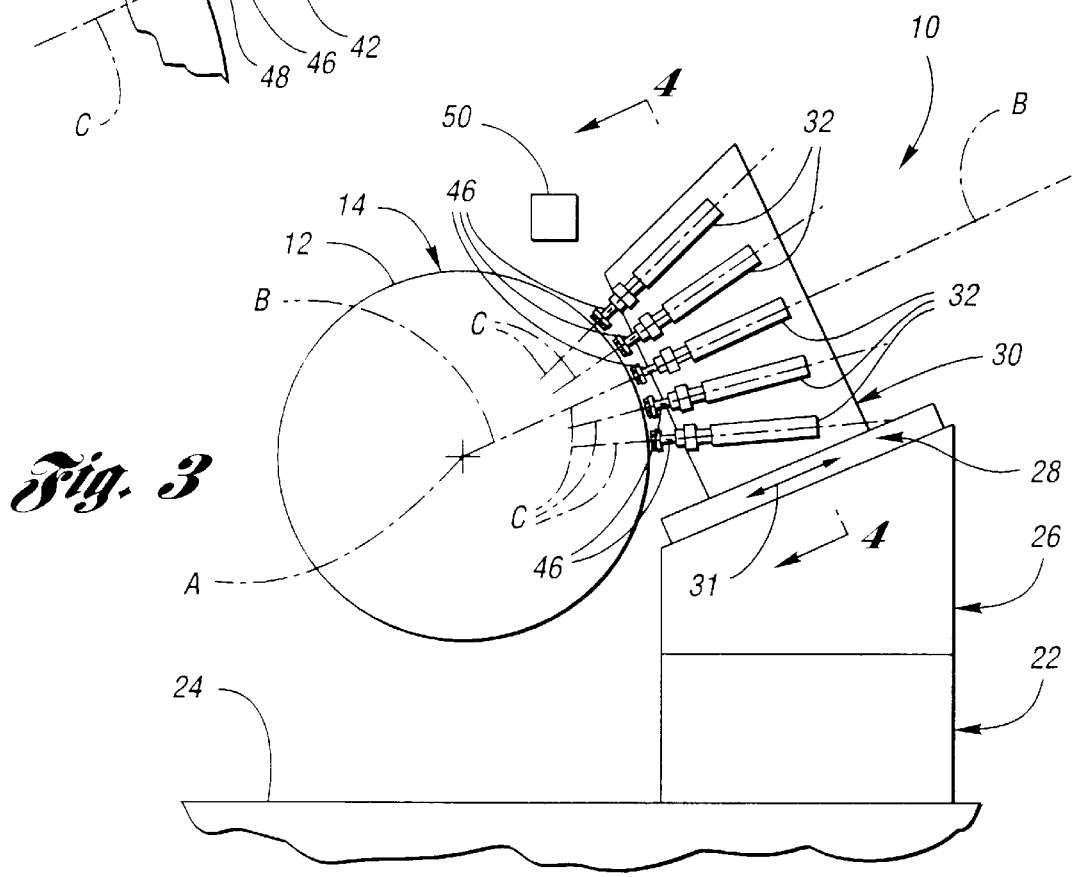
FIG. 3 is an enlarged view of a portion of FIG. 2 for schematically illustrating the construction of the electrode positioners.

The electrode positioners 32 as illustrated in FIG. 3 each have a housing 38 that is mounted on the housing 30 and supports a slide 40 that is moved by an electro servo motor in any conventional manner along an associated feed axis C. The slide 40 supports a servo head 42 on which an electrode holder 44 that supports an electrode 46 whose distal end is located adjacent the round surface 12 of the roll 14 and which supports a brush 48 that contains dielectric fluid supplied through the electrode for the electric-discharge texturing operation. This dielectric fluid is supplemented by a dielectric fluid supply 50 shown in FIG. 2 for generally wetting the roll surface 12 as it is rotated for the texturing. Each electrode 46 is 30 moved along the associated feed axis C toward and away from the roll surface 12 under the control of an electric servo motor supported within the electrode positioner housing 38.

As shown in FIG. 2, the feed axes C of the electrode positioners 32 of the axial rows extend angularly with respect to each other in an outwardly diverging manner from the roll 14 and are equally angularly spaced from each other as well as being symmetrically located on opposite sides of the adjustment axis B. This construction facilitates positioning of the electrodes 46 with rolls of relatively small diameters.

As illustrated in FIG. 2, the adjustment axis B of the housing 30 supported by the auxiliary slideway 28 on the carriage 26 is inclined upwardly away from the central axis A and thereby helps in preventing dielectric fluid from entering the electrode positioners 34 during the electric-discharge texturing operation. This texturing operation is performed with the carriage 26 moved axially along the slideway 22 as each electrode positioner 32 properly locates its associated electrode the appropriate distance from the roll surface 12 in order to ensure the sparking required for the electric-discharge texturing.

As illustrated in FIG. 4, the bank of electrodes 32 includes an odd number of axial rows 34. One of the rows 34 as shown in FIG. 2 is located midway between the lowest and highest row and is positioned along the adjustment axis B such that the feed axis C of each electrode positioner 32 in this row is also along the adjustment axis B of the housing. The other axial rows 34 of electrode positioners 32 have the same number on opposite sides of the adjustment axis B. More specifically, this bank of electrode positioners 32 includes five axial rows 34 such that there are two axial rows above and two axial rows below the adjustment axis B as well as the one axial row located along the adjustment axis B.

Another embodiment of the electric-discharge texturing apparatus indicated by 10' is illustrated in FIG. 5 and has the same construction as the other embodiment except as will be noted such that like reference numerals are applied to like components thereof and the previous description is thus applicable and will not be repeated. The electric-discharge texturing apparatus 10' has a bank of electrode positioners 32 that, as shown in FIG. 6, includes an even number of axial rows 34 rather than an odd number of such axial rows as with the previously described embodiment. Furthermore, the adjustment axis B of the housing 30 along which the electrode positioners 32 are moved bisects the angle between the feed axes C of the electrode positioners of two axial rows 34 and has the same number of axial rows positioned symmetrically on opposite sides of the adjustment axis B. More specifically, the bank of electrode positioners 32 has six axial rows 34 such that there are three axial rows above the adjustment axis B and three axial rows below the adjustment axis B. The angle between the adjustment axis B and the adjacent feed axis C of each adjacent axial row 34 is one-half of the angle between the equally spaced axial rows due to the manner in which the adjustment axis C bisects this angle as previously described.

As illustrated in both FIGS. 4 and 6, both of the embodiments have the bank of electrode positioners 32 provided with generally circumferential columns 36 that are slightly axially inclined along the central axis A so as to provide distribution of the texturing operation provided by the bank of electrode positioners. The number of columns 36 can vary but usually will be five or six.

While the best mode for practicing the invention has been described in detail, those familiar with the art to which this invention relates will recognize various alternative designs and embodiments for practicing the invention as defined by the following claims.

What is claimed is:

1. Apparatus for electric-discharge texturing of a round surface of a roll, comprising:

a rotational support for rotatably supporting and rotating the roll about a central axis;

a main slideway that extends parallel to the central axis;

a carriage supported for movement along the main slideway and including an auxiliary slideway that extends transversely to the central axis;

an electrode positioner housing mounted on the carriage by the auxiliary slideway for movement toward and away from the roll along an adjustment axis that extends radially from the central axis; and a bank of electrode positioners mounted on the housing in a plurality of axial rows along the central axis and in a plurality of generally circumferential columns along the central axis, the electrode positioners each being operable to support an electrode for movement along an associated feed axis toward and away from the roll to provide the proper positioning therebetween for the electric-discharge texturing, and the feed axes of the electrode positioners of the axial rows extending angularly with respect to each other in an outwardly diverging manner from the roll and being equally angularly spaced from each other as well as being symmetrically located on opposite sides of the adjustment axis.

2. Apparatus for electric-discharge texturing of a round surface of a roll as in claim 1 wherein the adjustment axis of the housing is inclined upwardly away from the central axis.

3. Apparatus for electric-discharge texturing of a round surface of a roll as in claim 1 wherein the bank of electrode positioners includes an odd number of axial rows with the feed axes of the electrode positioners of one axial row being positioned along the adjustment axis and with the other axial rows being of the same number on opposite sides of the adjustment axis.

4. Apparatus for electric-discharge texturing of a round surface of a roll as in claim 3 wherein the bank of electrode positioners includes five axial rows.

5. Apparatus for electric-discharge texturing of a round surface of a roll as in claim 1 wherein the bank of electrode positioners includes an even number of axial rows with the adjustment axis bisecting the angle between feed axes of the electrode positioners of two axial rows and with the same number of axial rows positioned symmetrically on opposite sides of the adjustment axis.

6. Apparatus for electric-discharge texturing of a round surface of a roll as in claim 5 wherein the bank of electrode positioners includes six axial rows.

7. Apparatus for electric-discharge texturing of a round surface of a roll as in claim 1 wherein the bank of electrode positioners includes generally circumferential columns that are slightly axially inclined along the central axis.

8. Apparatus for electric-discharge texturing of a round surface of a roll, comprising:

a rotational support for rotatably supporting and rotating the roll about a central axis;

a main slideway that extends parallel to the central axis;

a carriage supported for movement along the main slideway and including an auxiliary slideway that extends transversely to the central axis;

an electrode positioner housing mounted on the carriage by the auxiliary slideway for movement toward and away from the roll along an adjustment axis that extends radially away from the central axis in an upwardly inclined orientation; and a bank of electrode positioners mounted on the housing in a plurality of axial rows along the central axis and in a plurality of generally circumferential columns that are slightly inclined along the central axis, the electrode positioners each being operable to support an electrode for movement along an associated feed axis toward and away from the roll to provide the proper positioning therebetween for the electric-discharge texturing, and the feed axes of the electrode positioners of the axial rows extending angularly with respect to each other in an outwardly diverging manner from the roll and being equally angularly spaced from each other as well as being symmetrically located on opposite sides of the adjustment axis.

9. Apparatus for electric-discharge texturing of a round surface of a roll, comprising:

a rotational support for rotatably supporting and rotating the roll about a central axis;

a main slideway that extends parallel to the central axis;

a carriage supported for movement along the main slideway and including an auxiliary slideway that extends transversely to the central axis;

an electrode positioner housing mounted on the carriage by the auxiliary slideway for movement toward and away from the roll along an adjustment axis that extends radially away from the central axis in an upwardly inclined orientation; and a bank of electrode positioners mounted on the housing in a plurality of axial rows of an odd number along the central axis and in a plurality of generally circumferential columns that are slightly inclined along the central axis, the electrode positioners each being operable to support an electrode for movement along an associated feed axis toward and away from the roll to provide the proper positioning therebetween for the electric-discharge texturing, and the feed axes of the electrode positioners of the axial rows extending angularly with respect to each other in an outwardly diverging manner from the roll and being equally angularly spaced from each other with the one axial row having the feed axes of its electrode positioners extending along the adjustment axis and with the other axial rows being of the same number and symmetrically located on opposite sides of the adjustment axis.

10. Apparatus for electric-discharge texturing of a round surface of a roll, comprising:

a rotational support including headstock and tailstock centers for rotatably supporting and rotating the roll about a central axis;

a main slideway that extends parallel to the central axis;

a carriage supported for movement along the main slideway and including an auxiliary slideway that extends transversely to the central axis;

an electrode positioner housing mounted on the carriage by the auxiliary slideway for movement toward and away from the roll along an adjustment axis that extends radially away from the central axis in an upwardly inclined orientation; and a bank of electrode positioners mounted on the housing in a plurality of axial rows of an even number along the central axis and in a plurality of generally circumferential columns that are slightly inclined along the central axis, the electrode positioners each being operable to support an electrode for movement along an associated feed axis toward and away from the roll to provide the proper positioning therebetween for the electric-discharge texturing, and the feed axes of the electrode positioners of the axial rows extending angularly with respect to each other in an outwardly diverging manner from the roll and being equally angularly spaced from each other with the adjustment axis bisecting the angle between the feed axes of the electrode positioners of two axial rows with the other axial rows being of the same number and symmetrically located on opposite sides of the adjustment axis.

* * * * *